United States Patent
Reams

(10) Patent No.: US 6,253,483 B1
(45) Date of Patent: Jul. 3, 2001

(54) FISH STRIKE SENSOR WITH DISTINCT AUDIO ALARM

(76) Inventor: Jim A Reams, 1755 W. 13235 South, Riverton, UT (US) 84066

( * ) Notice: Subject to any disclaimer, the term of this patent is extended or adjusted under 35 U.S.C. 154(b) by 0 days.

(21) Appl. No.: 09/427,609

(22) Filed: Oct. 27, 1999

Related U.S. Application Data

(60) Provisional application No. 60/106,079, filed on Oct. 29, 1998.

(51) Int. Cl.$^7$ .................................................. A01K 85/01
(52) U.S. Cl. .................................................. 43/17
(58) Field of Search .................................................. 43/17

(56) References Cited

U.S. PATENT DOCUMENTS

| | | | |
|---|---|---|---|
| 4,928,419 | * | 5/1990 | Forrestal .................................. 43/17 |
| 4,930,243 | * | 6/1990 | Lowe et al. ............................... 43/17 |
| 5,010,678 | * | 4/1991 | Peck et al. ................................ 43/17 |
| 5,088,223 | * | 2/1992 | Chu .......................................... 43/17 |
| 5,261,180 | * | 11/1993 | Foster et al. .............................. 43/17 |
| 5,321,391 | * | 6/1994 | Fox ......................................... 340/573 |
| 5,501,027 | * | 3/1996 | Acker ....................................... 43/17 |
| 5,771,624 | * | 6/1998 | Vickery et al. ........................... 43/17 |
| 5,782,033 | * | 7/1998 | Park et al. ................................. 43/4 |
| 5,797,211 | * | 8/1998 | Bae et al. .................................. 43/17 |
| 5,867,931 | * | 2/1999 | Morris ...................................... 43/17 |
| 5,894,691 | * | 4/1999 | Zepeda, Sr. .............................. 43/17 |

FOREIGN PATENT DOCUMENTS 2 273 858 * 7/1994 (GB) ....................................... 43/17

* cited by examiner

*Primary Examiner*—Kurt Rowan
(74) *Attorney, Agent, or Firm*—Rodger H. Flagg

(57) ABSTRACT

The increased tension in the fishing line created by a strike causes an alarm sensor with an armature to be pulled downward bringing a distal portion of a primary sensor wire into contact with a distal portion of a secondary sensor wire to complete an electrical circuit and activating an alarm circuit within a housing. An adjustable loop permits the selectivity of the sensor to be adjusted. The alarm sensor has a distal portion of the secondary wire formed in a triangular configuration to provide an expanded surface area for contact with the distal portion of the primary sensor wire. A rubber clamp has a slit which enable the clamp to be fitted over a distal end of the fishing rod. The alarm sensor is electrically connected to the electrical circuit mounted on the handle by a two-conductor cable having the primary sensor wire and the secondary sensor wire. The electrical circuit is powered by a battery and includes a record/playback switch, a reset switch, an on/off switch, a microphone, a speaker and a memory buffer are contained in an alarm circuit housing.

20 Claims, 2 Drawing Sheets

FISH STRIKE SENSOR WITH DISTINCT AUDIO ALARM

This application claims benefit of Provisional Application No. 60/106,079 filed Oct. 29, 1998.

SUMMARY OF THE INVENTION

1. Field of the Invention

This invention is related to the field of fish-strike alarm devices that are used in cooperation with conventional fishing rods and that produce an audio alarm in response to a fish striking the fishhook at the end of the fishing line.

2. Description of the Prior Art

Described in the prior art are numerous alarm devices for use with a fishing rod and which respond to the pull of a fish on the fishing line. Such an alarm permits a fishing rod to remain somewhat unattended while the fisherman waits for a strike and allows the fisherman an opportunity to devote attention to other matters during this time.

An audio signal is one of the most prevalent formats for such an alarm. For instance, the fish-strike alarm device disclosed in U.S. Pat. No. 5,063,373 generates an audio alarm to alert the fisherman as soon as a first strike occurs. However, the audio alarm that is generated is simply that produced by a buzzer, and therefore a person hearing the alarm cannot distinguish its sound from that of other similar alarms located in the vicinity. Such uncertainty may cause the fisherman to prematurely pull in the fishing line, thus hindering or even destroying a pending strike opportunity. Furthermore, because of the confusion produced by such uncertainty, the user may respond too slowly to a strike, ignore a legitimate alarm thinking it is that of another's fishing rod or turn the device off entirely.

BRIEF SUMMARY OF THE INVENTION

One objective of this invention is the development of an audio alarm device for use with a fishing rod having a sensor to detect a fish-strike and an alarm generator that produces a distinct audio signal so that no uncertainty is created by its sounding, thus providing the user with absolute certainty that the alarm is legitimate.

Another objective of the invention is to construct the sensor used for the alarm in such a way that when a strike occurs, the probability of its detection is great.

A further objective of the invention is to provide a means for varying the sensitivity of the sensor in accordance with the kind of fish being expected, the sensitivity being lessened for more active fish and being made greater for less active fish, thereby providing a relatively consistent alarm sensitivity regardless of the kind of fish striking the line.

A further objective of the invention is to provide an electrical design for the device such that the alarm circuitry operates in a power-down mode in the absence of an alarm condition and is quickly made to operate in a power-up condition in the event of a strike, thereby maintaining battery life.

In order to achieve these objectives, the alarm device of the present invention is provided with a means for producing an audio alarm that is unique and distinct and that can be altered on-site so as to cause it to be distinguishable from any and all similar alarms being generated in the vicinity. By speaking into a microphone located on an alarm circuit housing mounted on the handle of the fishing rod, the user is able to record on-site a voice message that is unique. This message is stored in a memory within the alarm circuit and is played back through a speaker that is located within the alarm circuit housing.

In addition, the sensor for detecting a fish strike is designed so as to activate the alarm by closing a normally open electrical connection between the two wires of a two-conductor cable, with the contact portion of one of the two wires having an increased area so as to increase the likelihood of a proper electrical connection.

Furthermore, the spacing between the two contact points of the two-conductor cable is made to be adjustable so as to enable the responsivity of the sensor to a fish strike to be varied in accordance with the expected nature of the fish strike.

Also, the processing circuit that governs the operation of the alarm is chosen to have a power-down/power-up feature so that in the absence of strike condition the unit operates in a reduced power mode.

Various other purposes and advantages of the invention will be made apparent from the following description.

DETAILED DESCRIPTION

Figure 1:
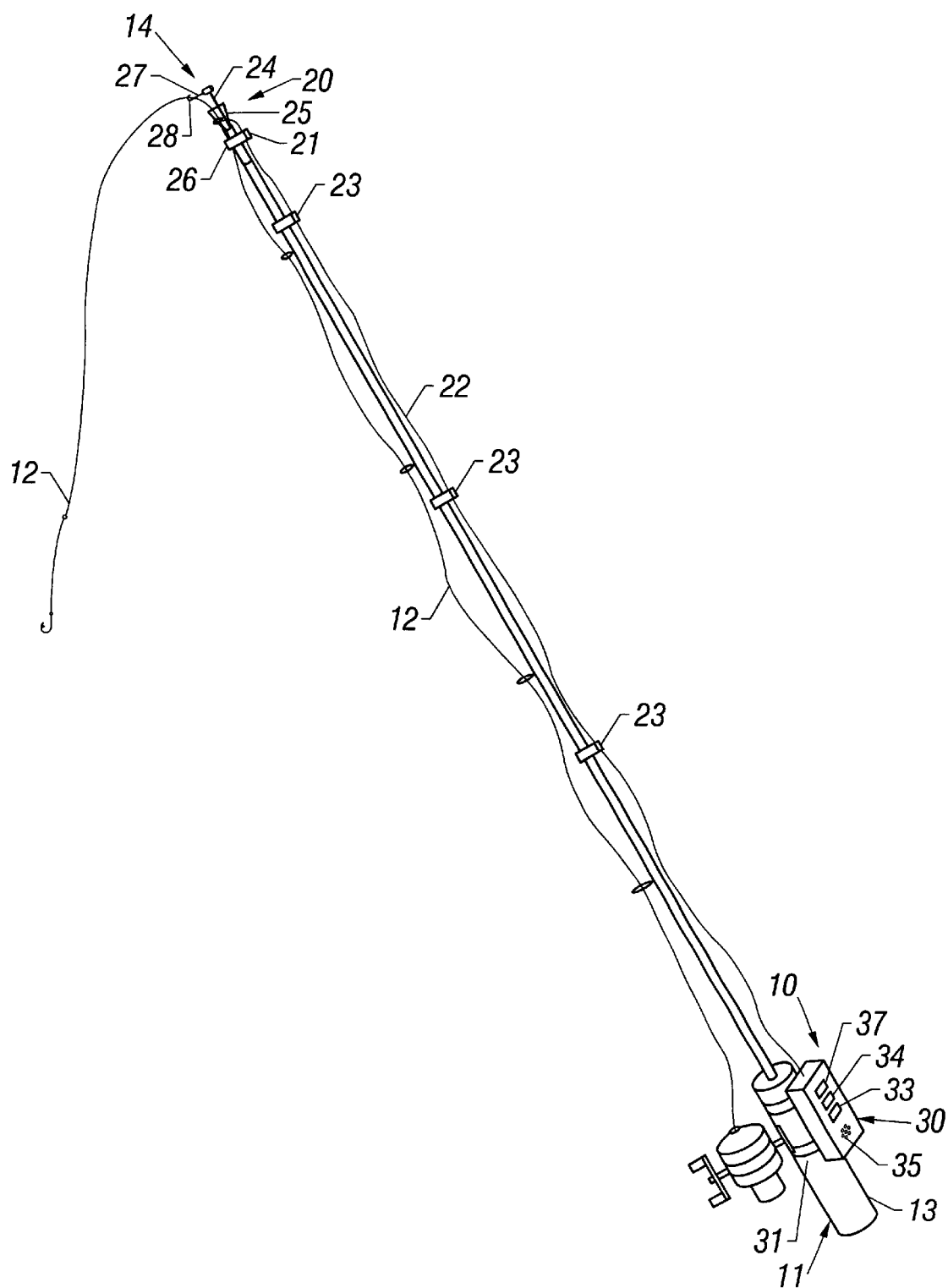
FIG. 1 is a pictorial view of the fish strike alarm device showing both the sensor and the alarm circuit housing.

This invention makes use of known mechanical and electrical components to provide a uniquely distinguishable audio alarm in response to the occurrence of a fish strike. The audio alarm that is generated has a unique characteristic, thus enabling its user to unmistakably distinguish its alarm feature from other audio alarms being generated in the vicinity.

The components comprising the device are combined as shown in the drawings according to following description.

FIG. 1 illustrates the overall configuration of the fish strike alarm apparatus 10 showing both the sensor 20 and the alarm circuit housing 30 attached to a conventional fishing pole 11. The alarm sensor 20 is slidably attached over the distal end 14 of the fishing pole 11 by means of a rubber clamp 21. The alarm housing 30 is a water proof box that is detachably attached to the handle 13 of the fishing pole 11 by means of expandable clamps 23 which enable easy attachment to the handle 13 through the application of pressure to the top of the alarm circuit housing 30. The alarm circuit housing 30 contains a microphone 36 and a speaker 35 for use in the recording and sounding of an audible alarm.

The alarm circuit housing 30 also contains electronic circuitry 31 (See FIG. 3) for operating the alarm device. The alarm sensor 20 is electrically connected to the electronic circuitry 31 within the alarm circuit housing 30 by means of a two-conductor cable 22 comprising a primary sensor wire 24 and a secondary sensor wire 25.

The two-conductor cable 22 is mechanically attached by clamps 23 to fishing pole 11 at a plurality of locations as shown in FIG. 1. The number of clamps may be varied in accordance with the length of the fishing pole 11 to achieve a desired tension in the two-conductor cable 22. The first sensor wire 24 and the secondary sensor wire 25 are individually insulated throughout the length of the two-conductor cable except for their distal portions which extend beyond the rubber clamp 21. The insulation is removed from the extended portions of these wires to form bare wire portions which protrude from the end of the rubber clamp as seen in FIG. 1. These bare wire portions serve as electrical contacts which enable the conductor portions of the primary wire 24 and the secondary wire 25 to touch, thereby completing an electrical circuit and activating the alarm.

A hook-shaped armature 27 is attached to a loop 28 formed in the distal portion of the primary sensor wire 24. The fishing line 12 is looped over the hooked-shaped armature 27 as seen in FIG. 1.

When a fish strike occurs, the increased tension in the fishing line created by the strike causes the armature 27 to be pulled downward, thereby bringing the distal portion of primary sensor wire 24 into contact with the distal portion of the secondary sensor wire 25, completing an electric circuit within two-conductor cable 22 and activating the alarm circuitry within the alarm housing 30. The wire used for the primary wire 24 and the secondary wire 25 is of sufficient stiffness to enable the separation between their distal portions to be maintained at a selected distance.

By adjusting the loop 28, the sensitivity of the sensor to a fish strike is made variable, Thus if it is expected that the fish which will strike the fishing line is of a more active variety the size of the loop can be increased, thereby reducing the sensitivity of the sensor to a strike; and if the fish is expected to be of a less active variety the size of the loop can be decreased, thereby increasing the sensitivity of the sensor. In this way, the sensitivity of the sensor can be made approximately uniform, regardless of the kind of fish striking the line.

Figure 2:
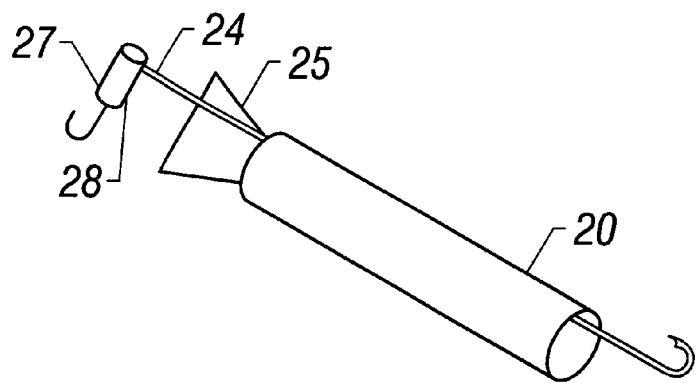
FIG. 2 is a detailed portrayal of the sensor portion of the device.

FIG. 2 illustrates the alarm sensor 20. The distal portion of secondary wire 25 is formed in a triangular shape in order to provide an expanded surface area for contact with the distal portion of the primary sensor wire 24, thereby increasing the probability of indicating a strike condition. Rubber clamp 21 has a slit 26 which enables expansion of the clamp 21 as it is fitted over the distal end of the fishing rod 11 to secure the primary and secondary sensor wire 24, 25 thereon.

Figure 3:
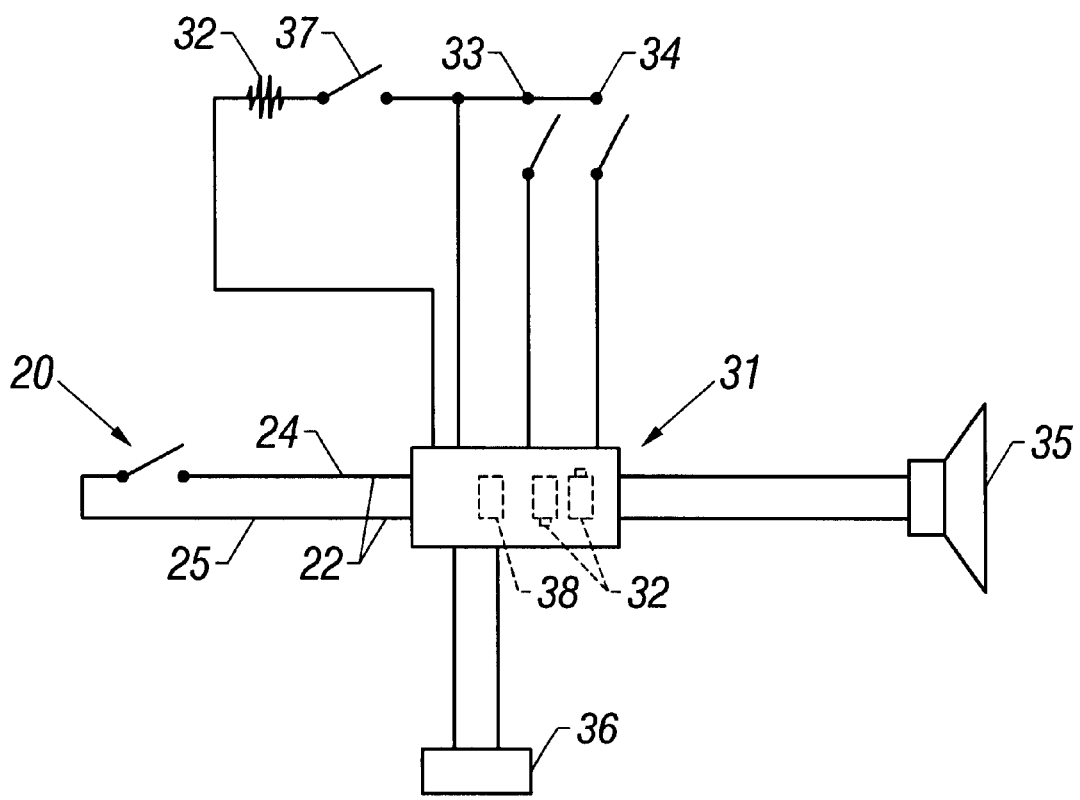
FIG. 3 is a circuit diagram of the electrical circuit housed in the alarm circuit housing and controlling the alarm device.

In FIG. 3, the electrical circuit 31 that controls the operation of the fish strike alarm apparatus 10 is shown. The electronic circuit 31 is powered by a battery 32 and includes a record/playback switch 33, a reset switch 34, an ON/OFF switch 37, a microphone 36 a speaker 35 and a memory buffer 38. The electronic circuit 31 is operable in either a playback mode or a record mode. The playback mode is enabled by setting the record/playback switch 33, located on the alarm circuit housing 30, in the "playback" position.

The playback mode is activated when a strike occurs and electrical contact is made between the distal portions of the primary wire 24 and the secondary wire 25. An audio alarm is then sounded in the form of a prerecorded voice message that is sounded via the speaker 35. The message may be any of a variety of sentences such as "Wake up, you've got a bite on line 3!" Multiple fishing poles 11 may thus be programmed to designate which of the multiple fishing poles 11 received a bite. This has significant advantages where multiple fishing poles 11 are positioned in close proximity, such as on a dock, pier, or boat. The playback mode may be actuated repeatedly, thus adapting the alarm to be in a continuously active condition.

The record mode is activated by setting the record/playback switch 33 in the "record" position. A message to be used as the audio alarm may then be recorded by means of the user speaking into the microphone 36. The electronic circuit 31 preferably comprises a commercially available processor such as an ISD1416P and contains circuitry by which the output from the microphone 36 is digitized and stored in a buffer memory 38. This recording arrangement enables the audio alarm to be varied as desired, thereby creating an alarm that is unique to each user and uniquely distinct from other audio alarms being used in the vicinity. The alarm can be changed on-site as desired, thus enabling the user to alter the distinctiveness of his or her alarm after listening to those being used by others nearby. A built-in voice message is also stored in the buffer memory of the processing circuit 31 and is made available as a permanent feature of the device. This enables a standard alarm to be used if no similar alarms are being used in the vicinity or if the user simply desires to use it. The electronic circuit 31 also includes circuitry by which the message stored in the buffer memory 38 is read out during an alarm condition and converted to an analog signal which is amplified and used to drive the speaker 35, thereby sounding the alarm.

A reset switch 34 is provided and made accessible to the user on the alarm circuit housing 30. Activation of the reset switch 34 resets the alarm circuitry, if needed. The alarm circuitry is preferably automatically reset after each alarm strike. When the alarm circuitry is automatically reset after each alarm strike, there is no need to manually reset the circuitry in preparation for the next strike. Where the alarm circuitry is automatically reset after each strike, the reset switch 34 is an option, and may not be needed.

An ON/OFF switch 37 is also made accessible on the alarm circuit housing 30. The electronic circuit 31 is configured so that even in the ON condition, the device is maintained in a powered-down mode until an alarm condition occurs, at which time the alarm unit is quickly powered-up, thus extending the life of the battery 32.

Various changes in the details and materials that have been described may be made by those skilled in the art within the principles and scope of the invention herein illustrated and described. Therefore, while the present invention has been shown herein in what is believed to be the most practical and preferred embodiment, it is recognized that departures can be made therefrom within the scope of the invention, which is therefore not to be limited to the details disclosed herein but is to be accorded the full scope of the description so as to embrace any and all equivalent embodiments.

PARTS LIST

10—Fish strike alarm apparatus
11—fishing pole or rod
12—fishing line
13—fishing rod handle
14—distal end of fishing pole
20—alarm sensor
21—rubber clamp
22—two conductor cable
23—expandable clamps
24—primary sensor wire
25—secondary sensor wire
26—clamp slit
27—hook shaped armature
28—loop
30—alarm circuit housing
31—electronic circuit
32—battery
33—record/playback switch
34—reset switch
35—speaker
36—microphone
37—on/off switch
38—memory buffer

I claim:

1. A fish strike signal apparatus which is releasably secured to a fishing pole, which comprises: an alarm circuit housing releasably secured to a handle of the fishing pole, the alarm circuit housing having electronic circuitry disposed within to operatively connect a microphone adapted to pick up a distinct analog voice signal, the distinct analog voice signal is then converted to a digital alarm signal by a processing circuit built into the electronic circuitry, and the digital alarm signal is then stored in a memory buffer located within the electronic circuitry, and said digital alarm signal is subsequently converted to an analog alarm signal which is amplified by the electronic circuitry to drive a speaker upon actuation of an alarm sensor, said alarm sensor is responsive to a primary sensor wire and a secondary sensor wire forming electrical contacts which are drawn together upon the increased tension on a fishing line extending from said fishing pole during a fish strike to complete the electronic circuitry and actuate a distinct audible alarm.

2. The fish strike signal apparatus of claim 1, wherein the alarm circuit housing is waterproof.

3. The fish strike signal apparatus of claim 1, wherein the operatively connected electronic circuitry is battery operated.

4. The fish strike signal apparatus of claim 1, wherein the electronic circuitry includes a powered-down mode until an alarm signal is received from the alarm sensor, whereupon the alarm signal is powered-up for a preset time, to preserve and extend the life of the battery.

5. The fish strike signal apparatus of claim 1, wherein the primary sensor wire includes an adjustable loop formed in a distal portion of the primary sensor wire, with a hook-shaped armature attached to the loop, with the fishing line passed through the hook-shaped armature, and a distal end of the secondary sensor wire is positioned in spaced relation from the primary sensor wire, so that a fish strike pulls on the fishing line, which in turn biases the loop into engagement with the secondary sensor wire to actuate the distinct audible alarm.

6. The fish strike signal apparatus of claim 1, wherein the primary sensor wire and the secondary sensor wire are releasably secured to the fishing pole with clamps and the loop formed in the first sensor wire is adjustable in size.

7. The fish strike signal apparatus of claim 1, wherein a reset switch is provided on the alarm circuit housing to manually reset the fish strike signal after each use.

8. The fish strike signal apparatus of claim 1, wherein the fish strike signal is automatically reset after each use.

9. The fish strike signal apparatus of claim 1, wherein the memory buffer stores at least one pre-programmed digital alarm signal and at least one voice recorded digital alarm signal, and a user may selectively actuate one of the digital alarm signals stored in the digital memory buffer.

10. The fish strike signal apparatus of claim 1, wherein an on/off switch and a record/playback switch are each provided on the alarm circuit housing.

11. A fish strike signal apparatus which is releasably secured to a fishing pole, which comprises: a waterproof alarm circuit housing releasably secured to a handle of the fishing pole, the alarm circuit housing having battery powered electronic circuitry disposed within to operatively connect a microphone adapted to pick up a distinct analog voice signal, the distinct analog voice signal is then converted to a digital alarm signal by a processing circuit built into the electronic circuitry, and the digital alarm signal is then stored in a memory buffer located within the electronic circuitry, and said digital alarm signal is subsequently converted to an analog alarm signal which is amplified by the electronic circuitry to drive a speaker upon actuation of an alarm sensor, said alarm sensor is responsive to a primary sensor wire which includes an adjustably sized loop formed in a distal end portion of the primary sensor wire, with a hook-shaped armature attached to the loop, and a fishing line passed through the hook-shaped armature, and a distal end of the secondary sensor wire is positioned in spaced relation from the primary sensor wire, so that a fish strike pulls on the fishing line, which in turn biases the loop in the primary sensor wire into engagement with the secondary sensor wire to complete the electrical circuit and actuate a distinct audible alarm.

12. The fish strike signal apparatus of claim 11, wherein the battery powered electronic circuitry includes a powered-down mode until an alarm signal is received from the alarm sensor, whereupon the alarm signal is powered-up for a preset time, to preserve and extend the life of the battery.

13. The fish strike signal apparatus of claim 11, wherein an audible alarm signal may be modified on location to provide a distinct audible alarm signal in the presence of multiple alarm signals located on closely placed multiple fishing poles.

14. The fish strike signal apparatus of claim 11, wherein a reset switch is provided on the alarm circuit housing to manually reset the fish strike signal after each use.

15. The fish strike signal apparatus of claim 11, wherein the fish strike signal is automatically reset after each use.

16. The fish strike signal apparatus of claim 11, wherein the memory buffer stores at least one pre-programmed digital alarm signal and at least one voice recorded digital alarm signal, and a user may selectively actuate one of the digital alarm signals stored in the digital memory buffer.

17. The fish strike signal apparatus of claim 11, wherein an on/off switch and a record/playback switch are each provided on the alarm circuit housing.

18. A fish strike signal apparatus which is releasably secured to a handle of a fishing pole, an alarm circuit housing having battery powered electronic circuitry disposed within to operatively connect a microphone adapted to selectively pick up a distinct analog voice signal, the distinct analog voice signal is then converted to a digital alarm signal by a processing circuit built into the electronic circuitry, and the digital alarm signal is then stored in a memory buffer located within the electronic circuitry, said digital alarm signal is subsequently converted to an analog alarm signal which is amplified by the electronic circuitry to drive a speaker upon actuation of an alarm sensor, said alarm sensor is responsive to a primary sensor wire which includes a loop formed in a distal end portion of the primary sensor wire, with a hook-shaped armature attached to the loop in the primary sensor wire, and a fishing line is passed through the hook-shaped armature, with a distal end of the sensory wire positioned in spaced relation from the primary sensor wire, so that a fish strike pulls on the fishing line, which in turn biases the loop in the primary sensor wire into engagement with the secondary sensor wire to complete the electronic circuitry, which in turn actuates a distinct audible alarm.

19. The fish strike signal apparatus of claim 18, wherein the memory buffer stores at least one pre-programmed digital alarm signal and at least one voice recorded digital alarm signal, and a user may selectively actuate one of the digital alarm signals stored in the digital memory buffer.

20. The fish strike signal apparatus of claim 18, wherein an on/off switch and a record/playback switch are each provided on the alarm circuit housing.

* * * * *